2,704,766

PROCESS FOR THE MANUFACTURE OF SUBSTITUTED 4-METHYL COUMARINS

Herbert Nordt, Koln-Mulheim, and Detlef Delfs, Leverkusen-Schlebusch III, Germany, assignors to Farbenfabriken Bayer Aktiengesellschaft, Leverkusen, Germany, a corporation of Germany No Drawing. Application November 17, 1950, Serial No. 196,363

Claims priority, application France November 25, 1949

14 Claims. (Cl. 260—343.2)

The present invention relates to a new process of manufacturing 4-methyl coumarins, in particular 4-methyl coumarins substituted in the benzene nucleus.

It is known that 4-methyl coumarins, especially those containing in the benzene nucleus hydroxyl groups, can be prepared by reacting acetoacetic ester with monohydric or polyhydric phenols in the presence of dehydrating agents. For instance, 7-hydroxy 4-methyl coumarin is prepared from resorcinol and acetoacetic ester in the presence of concentrated sulfuric acid. In this process the temperature must not exceed 0° C. during the reaction in order to obtain yields satisfactory to some degree, and, besides, a large excess of sulfuric acid has to be used. The crude 4-methyl umbelliferone thus obtained has to be purified, e. g. by recrystallization.

It has now been found that 4-methyl coumarins substituted in the benzene nucleus may be prepared in a very advantageous way by first reacting in known manner monohydric or polyhydric phenols with molecular quantities of the dimer of ketene, the so-called diketene, with heating under formation of monoacetoacetates, and then by condensing these acetoacetates with elimination of water and ring formation to 4-methyl coumarins by means of sulfuric acid, zinc chloride, phosphoric acid, or other suitable condensing agents. This new process which uses instead of acetoacetic ester the cheaper diketene, further requires smaller quantities of the condensing agent, and results in better yields of purer crude material than the known process employing acetoacetic ester.

Monohydric phenols suitable for the present process are the phenol proper substituted in the benzene nucleus, e. g. by alkyl groups or by a condensed ring. As examples for these monohydric phenols may be mentioned the phenol homologues, such as the cresols or xylols and the naphthols. Polyhydric phenols which may be used are e. g. resorcinol, hydroquinone, and pyrogallol. In the first step, i. e. in the reaction of the phenols with diketene to form monoacetoacetates, basic or acid catalysts are used, e. g. pyridine or other pyridine bases, triethyl amine, sodium acetate, dimethyl aniline, and others, or benzene sulfonic acid, concentrated sulfuric acid, or others. The esterification is preferably carried out by slowly running a jet of diketene into the fused phenols containing the catalysts, and by keeping the reaction mixture at the fusing temperature of the phenols, until all the diketene has reacted; however, also solutions of phenols in inert solvents, such as benzene, may be used. The crude, still warm monoacetoacetates of the phenols may immediately be further reacted without any purification. Dehydrating agents, as e. g. concentrated sulfuric acid or sulfuric acid of 60° Bé., anhydrous zinc chloride, concentrated phosphoric acid, or similar agents are used to effect the ring formation. In contradistinction to the synthesis using acetoacetic ester, it is not necessary in the present process to keep the temperature below 0° C. In this step of the reaction, the fused crude ester is allowed to run usually at room temperature, or at a slightly elevated temperature, into the dehydrating condensing agent.

The reaction according to the new process may be represented by the following equation:

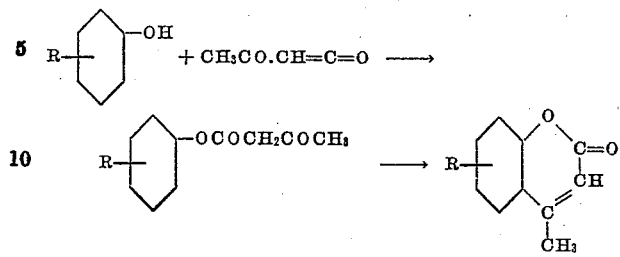

In this equation R means, as stated above, a substituent or substituents such as alkyl, hydroxy or a further benzene nucleus condensed to the one indicated in the formulae.

After removing the condensing agent in the usual manner, the products thus prepared are already sufficiently pure for many purposes.

The present invention is illustrated by the following examples, however, without being restricted thereto, the parts being by weight:

*Example 1*

100 parts of technical resorcinol and 0.5 parts of pyridine are fused at a temperature of about 105 to 110° C. While maintaining the reaction temperature of about 100 to 110° C., 84 parts of pure diketene (or the quantity of technical diketene corresponding to 84 parts of pure diketene) are slowly run in. Then the mixture is kept at a temperature of 100 to 110° C. until there is no longer perceived a smell of diketene. The crude, viscous monoacetoacetate of resorcinol cooled down to about 40 to 50° C. is then run into 630 parts of a 78 per cent sulfuric acid (60° Bé.). The temperature of the sulfuric acid is to be about 20 to 30° C. At this temperature the mixture is stirred for several hours, and thereupon poured on the threefold quantity of ice. The precipitated methyl umbelliferone is still stirred for a short time, sucked off, washed free from acid, and dried at 110 to 120° C. 170 parts of light-grey methyl umbelliferone of M. P. 180 to 184° C. (uncorrected) are obtained, which correspond to 96 per cent of theory.

*Example 2*

126 parts of pyrogallol and 1 part of pyridine base fraction of B. P. 150 to 170° C. are fused at about 130° C. Into this mixture 84 parts of pure diketene are run, as described in Example 1, and the reaction temperature is kept at 80 to 100° C. After the diketene has completely reacted, the ester is run into about 1000 parts of concentrated sulfuric acid at a temperature of 0° C. After pouring on ice 7.8-dihydroxy 4-methyl courmarin of M. P. 232° C. is obtained in a yield of about 70 per cent.

*Example 3*

110 parts of hydroquinone and 0.5 part of pyridine are dissolved in 150 parts of benzene, and a quantity of technical diketene corresponding to 84 parts of pure diketene is gradually added thereto. After all diketene has reacted, the benzene is distilled off, and the pulverized residue of the crude monoacetoacetate of hydroquinone is added in small portions to 630 parts of 78 per cent sulfuric acid, and stirred for 24 hours at room temperature. The mixture is then poured on ice, sucked off, and washed neutral. 72 to 75 parts of light-grey 6-hydroxy 4-methyl coumarin of M. P. 238° C. are obtained.

*Example 4*

144 parts of α-naphthol and 0.5 part of pyradine are fused at 100° C. and esterified with 84 parts of diketene, as described in Example 1, and condensed by means of concentrated sulfuric acid, as described in Example 2. About 67 per cent of 4-methyl 1.2-α-naphtho-pyrone are obtained.

Example 5

At 80° C. 84 parts of pure diketene are run, in a slow jet, into 108 parts of p-cresol and 0.5 part of dimethyl aniline, and then the mixture is further reacted, as described in Example 2. 4.6-dimethyl coumarin is obtained.

Example 6

110 grams of resorcinol with the addition of 0.5 gram of triethyl amine are, as in Example 1, esterified with diketene, and then run into a mixture of 300 cc. of concentrated phosphoric acid and 30 cc. of water at a temperature of 0° C. After standing over night, this mixture is poured on ice. About 150 grams of methyl umbelliferone are obtained, which correspond to 85 per cent of theory.

We claim:

1. Process of making 4-methyl coumarins substituted in the benzene nucleus, which comprises reacting a phenol selected from the group consisting of monohydric phenol homologues, polyhydric phenols and naphthols, with diketene in the presence of an esterification catalyst at an elevated temperature and not substantially above the melting point of the phenol to form a monoacetoacetate of the phenol, and then condensing said acetoacetate by means of a dehydrating condensing agent at a temperature between 0° C. and about 50° C. without isolating it from the reaction mixture.

2. Process of making 4-methyl coumarins substituted in the benzene nucleus, which comprises reacting a phenol selected from the group consisting of monohydric phenol homologues, polyhydric phenols and naphthols, with diketene in the presence of an esterification catalyst at an elevated temperature and not substantially above the melting point of the phenol, and then introducing said acetoacetate in the crude state without prior purification into a dehydrating condensing agent at a temperature between 0° C. and about 50° C.

3. Process of making hydroxy 4-methyl coumarins, which comprises reacting a polyhydric phenol with diketene in the presence of an esterification catalyst at an elevated temperature and not substantially above the melting point of the polyhydric phenol to form a monoacetoacetate of the polyhydric phenol, and then condensing said acetoacetate by means of a dehydrating condensing agent at a temperature between 0° C. and about 50° C. without isolating it from the reaction mixture.

4. Process of making 7-hydroxy 4-methyl coumarin, which comprises reacting resorcinol with diketene in the presence of an esterification catalyst at an elevated temperature not substantially above the melting point of resorcinol to form the monoacetoacetate of resorcinol, and then introducing the crude acetoacetate so formed into a dehydrating condensing agent at a temperature between 0° C. and about 50° C.

5. Process according to claim 4 in which sulfuric acid of a concentration between 60° Bé. and concentrated sulfuric acid is used as the dehydrating condensing agent.

6. Process of making 4-methyl coumarins substituted in the benzene nucleus, which comprises condensing a monoacetoacetate of a phenol selected from the group consisting of monohydric phenol homologues, polyhydric phenols and naphthols by means of a dehydrating condensing agent at a temperature between 0° C. and about 50° C.

7. Process according to claim 6 in which sulfuric acid of a concentration between 60° Bé. and concentrated sulfuric acid is used as the dehydrating condensing agent.

8. Process according to claim 7 in which 7-hydroxy 4-methyl coumarin is produced from the monoacetoacetate of resorcinol.

9. Process of making 4-methyl coumarins which comprises reacting a phenol of the formula

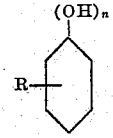

where R is selected from the group consisting of hydrogen and methyl, $n$ is a number from 1 to 3, with diketene in the presence of an esterification catalyst at an elevated temperature and not substantially above the melting point of the phenol to form a monoacetoacetate of the phenol, and then condensing said acetoacetate by means of a dehydrating condensing agent.

10. Process of making 4-methyl coumarin which comprises reacting pyrogallol with diketene in the presence of an esterification catalyst at an elevated temperature, and then condensing by means of a dehydrating condensing agent at a temperature between 0° C. and about 50° C.

11. Process of making 4-methyl coumarin which comprises reacting hydroquinone with diketene in the presence of an esterification catalyst at an elevated temperature, and then condensing by means of a dehydrating condensing agent at a temperature between 0° C. and about 50° C.

12. Process of making 4-methyl coumarin which comprises reacting alpha-naphthol with diketene in the presence of an esterification catalyst at an elevated temperature, and then condensing by means of a dehydrating condensing agent at a temperature between 0° C. and about 50° C.

13. Process of making 4-methyl coumarin which comprises reacting p-cresol with diketene in the presence of an esterification catalyst at an elevated temperature, and then condensing by means of a dehydrating condensing agent at a temperature between 0° C. and about 50° C.

14. Process of making 4-methyl coumarins which comprises reacting a phenol selected from the group consisting of monohydric phenol homologs, polyhydric phenols and naphthols with diketene in the presence of an esterification catalyst at an elevated temperature and not substantially above the melting point of the phenol to form a monoacetate of the phenol and then condensing said acetoacetate by means of a dehydrating condensing catalyst.

References Cited in the file of this patent

UNITED STATES PATENTS

| | | |
|---|---|---|
| 1,934,361 | Levinson | Nov. 7, 1933 |
| 2,298,459 | Boese | Oct. 13, 1942 |

FOREIGN PATENTS

Elderfield: Heterocyclic Compound, vol. 2, Wiley (1951), p. 186.

Boese: Ind. and Eng. Chem., "Diketene," 32, No. 1, pp. 16–22 (1940).

Sethra: Chemical Review, 36, 21 (1945).